United States Patent [19]

Wilson

[11] Patent Number: 5,457,577
[45] Date of Patent: Oct. 10, 1995

[54] QUICK-SET PRECISION OPTICAL HOLDER

[75] Inventor: Walter L. Wilson, Alexandria, Va.

[73] Assignee: The United States of America as represented by the Secretary of the Army, Washington, D.C.

[21] Appl. No.: 823,750

[22] Filed: Jan. 22, 1992

[51] Int. Cl.[6] .................................................. G02B 7/02
[52] U.S. Cl. ........................... 359/827; 359/811; 359/819
[58] Field of Search ................................. 359/819–821, 359/827, 896

[56] References Cited

U.S. PATENT DOCUMENTS

| | | | |
|---|---|---|---|
| 3,989,358 | 11/1976 | Melmoth | 359/819 |
| 4,408,830 | 10/1983 | Wutherich | 359/819 |
| 4,572,612 | 2/1986 | Schlapp et al. | 359/827 |
| 4,610,517 | 9/1986 | Fukino et al. | 359/827 |
| 4,640,578 | 2/1987 | Turner et al. | 359/827 |
| 5,053,794 | 10/1991 | Benz | 359/819 |

*Primary Examiner*—Thong Q. Nguyen
*Attorney, Agent, or Firm*—Milton W. Lee; Alain L. Bashore; Anthony T. Lane

[57] ABSTRACT

An optical holder for mounting and orienting a lens or lens subassembly by use of a removable retaining lens within a mount ring. Two adjustment set screws and a pressure pin mechanism hold the retaining lens. A constant pressure is applied against the set screws which is releasable. The retaining lens ring can then be removed and replaced without loss of alignment.

3 Claims, 2 Drawing Sheets

QUICK-SET PRECISION OPTICAL HOLDER

BACKGROUND OF THE INVENTION

1. Field of the Invention

The field of the invention disclosed herein is directed to optical holders with respect to alignment and replacement of lens and lens systems without loss of that alignment.

2. Description of Related Prior Art

Accuracy of alignment is known in the optics art, and the consistency of those alignments are of great concern to those skilled in the art. Examples of such concern in the prior art include U.S. Pat. Nos. 4,993,809, 4,938,489 and 4,767,188 which are all concerned with the precise location of alignment over long periods of use for optical elements. When the need to remove and reinstall the lens or lens systems has arisen, loss of the alignment has occurred. The prior art does not suggest how to maintain alignment when a lens or lens subassembly is removed and then replaced.

Previously, a lens system set over an opening in a plate over a laser scanner was adjusted by hand until a correct position was located. To secure the lens system in the proper position, adhesive tape was wrapped around the assembly in order to fix and hold its alignment. Since the tape held the system in only one position, there was no way to make any adjustments unless the tape was removed, thereby with loss of alignment. In addition, the tape would have a tendency to slip with time, necessitating readjustment.

SUMMARY OF THE INVENTION

The invention disclosed herein is directed to an optical holder for mounting and orienting a lens or lens subassembly. A retaining ring which attaches to a lens or lens subassembly is mounted in a mount ring and held in a locked position by two set of screws and a pressure pin mechanism. Alignment is adjusted via set screws which along with a pressure pin mechanism allows for adjustment. When alignment is set the pin mechanism allows for care of removal and replacement of the retaining ring without loss of alignment.

The primary objective of this invention is to provide an optical holder which can mount, align, and replace optical lens or lens systems precisely without loss of alignment.

BRIEF DESCRIPTION OF THE DRAWINGS

A full and complete understanding of the invention can be obtained from the following detailed description of the invention when read in conjunction with the annexed drawing in which.

PREFERRED EMBODIMENTS

Figure 1:
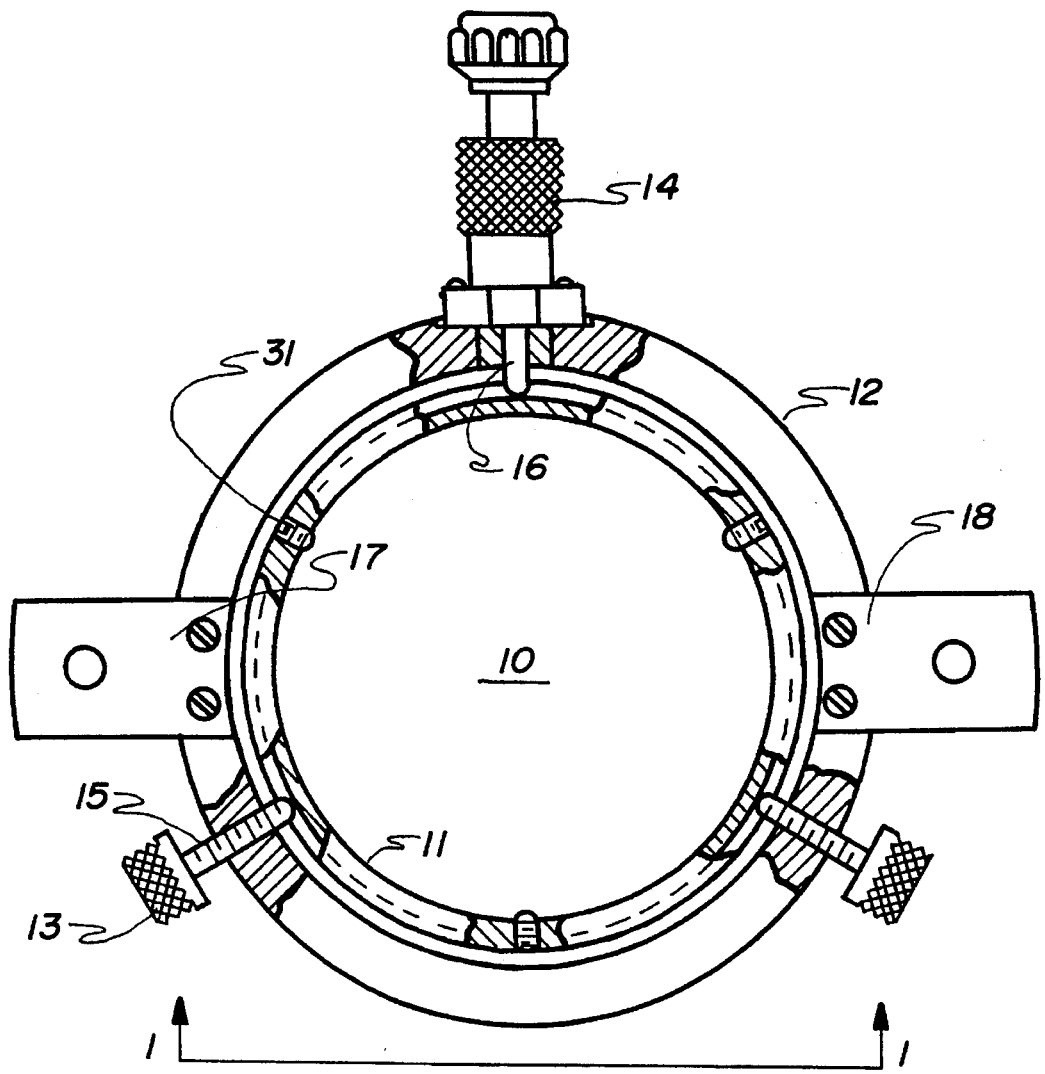
FIG. 1 shows a front view of the optical holder of this invention.
Figure 2:
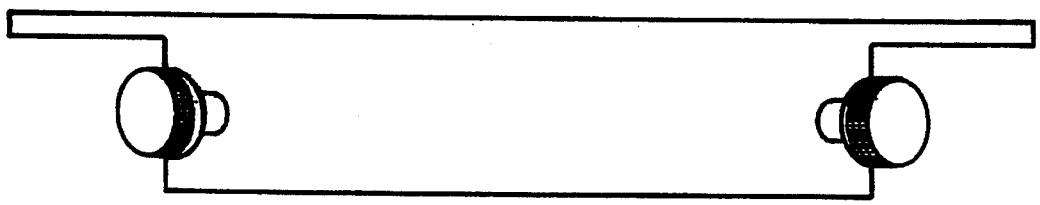
FIG. 2 shows a side view of the adjusting mount ring taken along line 1—1 of FIG. 1.

With reference to FIGS. 1 and 2 there is shown an optical holder 10 of the present invention. The optical holder 10 includes a retaining ring 11 held in a precisely locked position, concentrically mounted within an adjusting mount ring 12. The retaining ring 11 is held by two set screws 13 and a pressure pin mechanism 14. The set screws include shafts 15 which along with pressure pin 16 orient radially inward through ring 12 to engage a groove 17 of retaining ring 11. The screws and pin are oriented in the preferred embodiment of 120 degrees apart.

Figure 3:
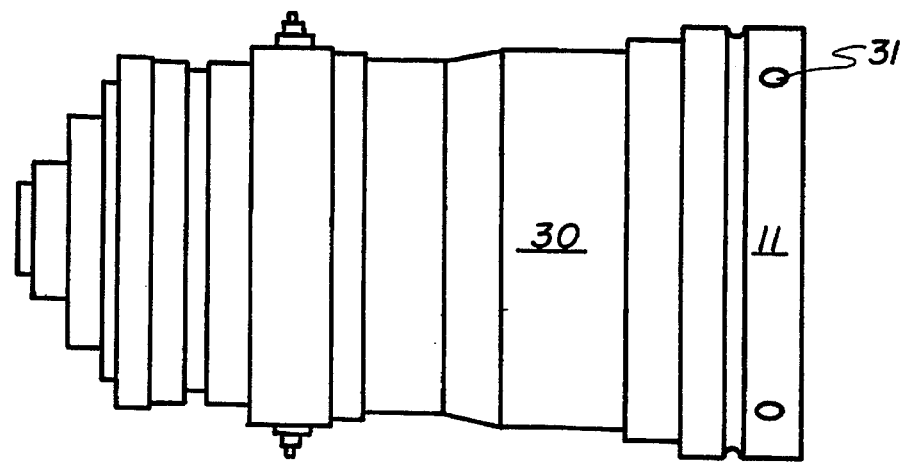
FIG. 3 shows a lens subassembly secured to an adjusting mount ring of the optical holder.

The retaining ring 11 is held in place by a constant pressure exerted by pin 16 against mount ring 12 and thus against shafts 15. Mount ring 12 is adjusted for alignment in a plane perpendicular to an optical axis of a lens or lens subassembly by turning at least one of said adjustment set screws 13. Also, the retaining ring 11 provides a method for attachment as shows in FIG. 3 of a lens or lens subassembly 30. A means for coupling is made by the use for example by holder 31 in the retaining ring.

Figure 4:
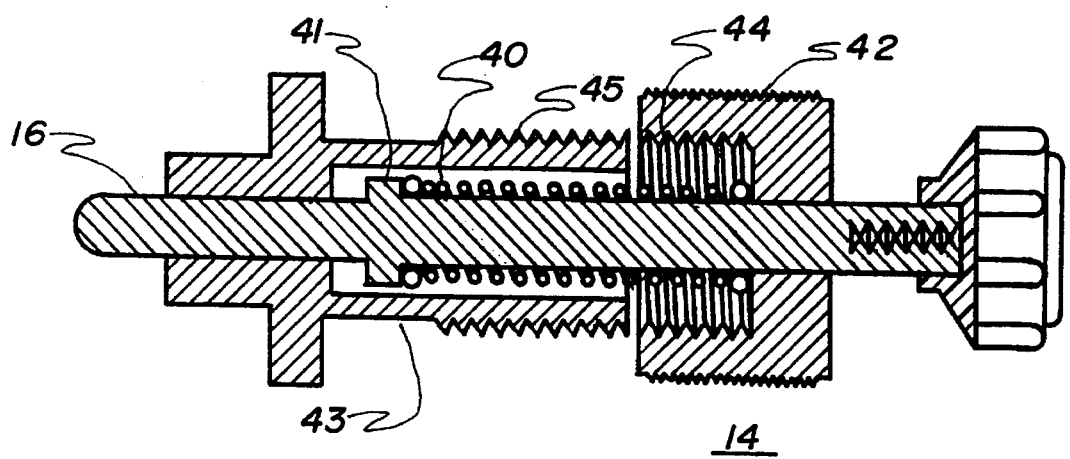
FIG. 4 shows sectional side view of the pressure pin mechanism.

Pressure pin mechanism 14 is shown in FIG. 4 which includes means for maintaining a constant pressure against set screws 13. A spring 40 is positioned around and biased against pin 16 at flange 41. The spring 40 is also biased at its other end against a body cap 42 removably engaged to a core body 43. The spring 40 and pin 16 are axially inserted into and movable within core body 43. By pulling out the other end of pressure pin 16 the retaining ring 11 may be inserted and removed.

While the optical holder may be designed up to any adjustment upper limit, the preferred embodiment is an adjustment for the retaining ring 11 to move approximately 120 mils in any direction from center. The mount ring 12 provides two tabs 18 as shown in FIG. 1 which provide a method of coupling the lens or lens subassembly to the remainder of an optical system. While any type of optical system may be utilized, the preferred embodiment utilized the holder 10 set over an opening in a laser scanner.

The materials for fabrication of the optical holder elements may be of any machinable material but preferably is composed of aluminum or brass. The cap inside surface 44 and any body outside surface 45 shown in FIG. 4 are knurled for ease of access to the interior of pressure pin mechanism 14. The spring 40 is preferably composed of steel-spring-stock.

Industrial applicability of this invention includes but is not limited to: optics, military and law enforcement.

This preferred embodiment is not intended to restrict the invention to the precise embodiment or embodiments described.

I claim:

1. An optical holder for mounting and orienting a lens or lens subassembly comprising:

an adjusting mount ring;

a removable retaining lens ring with means for coupling a lens or lens assembly concentrically mounted in said mount ring;

two adjustment set screws and a pressure pin mechanism each oriented radially inward around said mount ring for holding said lens ring in set alignment; and means for maintaining a constant pressure against said set screws in said mechanism which is releasable to remove said retaining lens ring without loss of alignment when said lens ring is replaced.

2. The holder of claim 1 wherein said means for maintaining a constant pressure include:

a pressure pin;

a spring positioned around said pin;

a core body with pressure pin axially and movably inserted into said body; and a body cap releasible secured to said body with said spring biased against said cap and pin.

3. The holder of claim 1 wherein said lens ring is adjustable.

* * * * *